May 19, 1936.  E. C. DE VORSS  2,040,981
GAUGE PIN
Filed Feb. 11, 1935
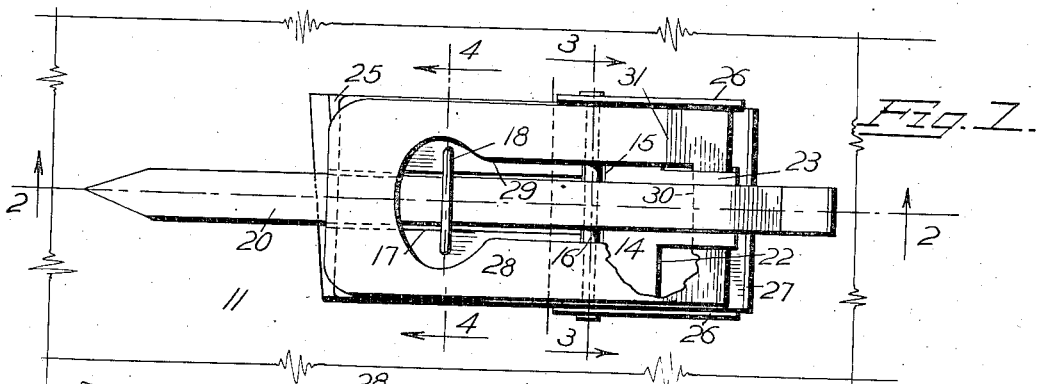
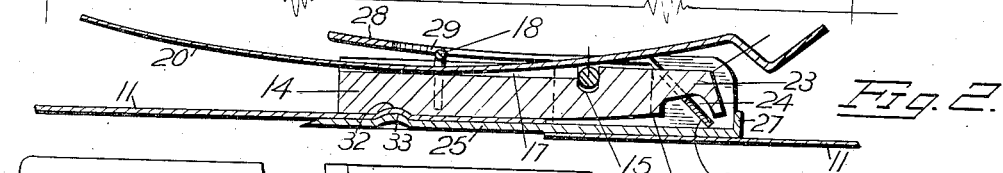
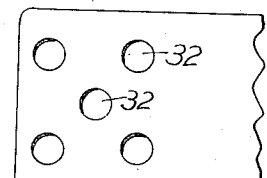
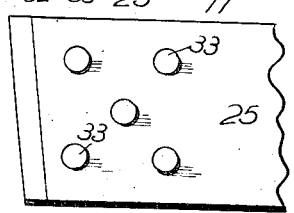
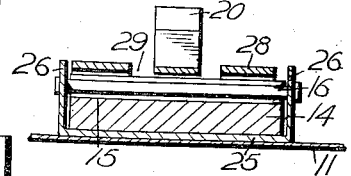
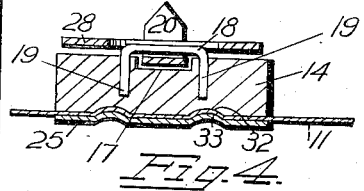
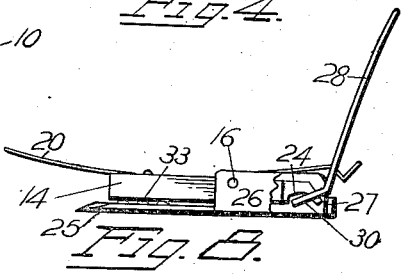
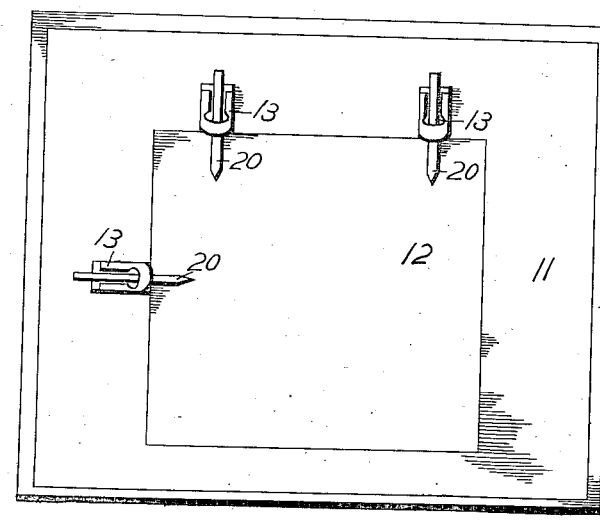
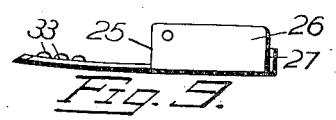
INVENTOR.
Elvin C. De Vorss
BY
ATTORNEY.

Patented May 19, 1936

2,040,981

UNITED STATES PATENT OFFICE 2,040,981

GAUGE PIN

Elvin C. De Vorss, Denver, Colo.

Application February 11, 1935, Serial No. 6,028

8 Claims. (Cl. 101—415)

This invention relates to improvements in printers' guides, or gauge pins of the type employed for positioning the paper on the platen of a printing press.

In the operation of printing, especially with presses of the Gordon type, it is necessary to attach to the tympan on the platen, gauge pins or guides that serve to support the paper and to position it transversely on the platen for the purpose of locating the printed matter uniformly on all the sheets printed. Where color work is being done, which requires the same sheet to be put through the press once for each color, it is very important that the sheet shall be very accurately positioned so as to register the colors.

It is the object of this invention to produce a gauge pin or printers' guide that shall be of simple and substantial construction and which can be easily and accurately attached to, positioned and adjusted on the tympan and which will stay in adjusted position.

Another object is to provide a gauge pin that shall be provided with a base member having a blade-like jaw provided with a sharp cutting edge that will penetrate the tympan without necessitating the use of a knife.

A further object is to provide a gauge pin that can be attached to the tympan without the use of glue or sealing wax and whose position can therefore be changed, if required, to obtain accurate adjustments.

A still further object is to produce a gauge pin of such construction that it will grip the tympan at the feed edge and therefore prevent the paper sheets from sliding underneath.

The above and other objects that may become apparent as this description proceeds are attained by means of a construction and an arrangement of parts that will now be described in detail, and reference for this purpose will be had to the accompanying drawing in which the invention has been shown in its preferred form and in which Figure 1 is a top plan view of the improved gauge pin to an enlarged scale;

Figure 2 is a section taken on line 2—2, Figure 1;

Figure 3 is a section taken on line 3—3, Figure 1;

Figure 4 is a section taken on line 4—4, Figure 1;

Figure 5 is a bottom elevation of the front end of the body member showing the recesses with which it is provided;

Figure 6 is a top plan view of the base of the gauge pin showing the diagonal sharpened end and the projections that cooperate with the recesses in the body member;

Figure 7 is a plan view of a platen showing a tympan in place thereon and three gauge pins attached to the tympan;

Figure 8 is a side elevation of a gauge pin showing the clamping lever in released position, a portion of the base being broken away to better disclose the position of the parts, and Figure 9 is a side elevation of the base showing the same removed from the remaining portions.

In the drawing, reference numeral 10 designates the platen of a printing press, and 11 the tympan or packing that is attached to the platen in the usual way. The sheet of paper that is to be printed is designated by reference numeral 12 and this is held in position by three gauge pins 13. The part of the platen which is at the top in Fig. 7 is in reality the bottom when positioned in an ordinary job press and has been shown as in Fig. 7 so as to conform to the printer's view thereof. In presses with horizontal platens a plan view thereof is as shown in Fig. 7.

The tympan 11, or packing as it is sometimes called, is composed of one or more layers of tough paper secured along the edges to the platen to improve the quality of the press work and the gauge pins, which will now be described, are attached to the tympan.

The gauge pin comprises a body member 14, is preferably die cast from some suitable metal and has a substantially rectangular cross section as shown in Figs. 3 and 4. The length of member 14 is considerably greater than its width and from the longitudinal section, shown in Fig. 2, it will be seen that the top surface is substantially flat and is provided with a transverse groove 15 for the reception of a pivot pin 16 to which further reference will be made. The upper surface is also provided with a longitudinally extending groove 17 that extends from the front end to the transverse groove 15.

A U-shaped wire, or staple, 18 has its sides 19 embedded in the material of member 14 on opposite sides of the groove 17 so as to straddle it, and forms with the groove an opening through which the pin 20 extends.

The under surface of body member 14 is flat from its front end and to a point slightly to the front of the groove 15 and from thence to its rear end it is slightly convex as indicated at 21 in Fig. 2. The rear end of member 14 has a notch 22 on each side and a central projection 23 whose under surface is provided with a transverse recess 24 whose function will presently appear. The part designated by reference numeral 25 and shown by itself in Fig. 9 will be referred to as the base and this is made from high grade tempered steel and consists of a piece of sheet steel provided along its opposite edges with short vertical sides 26 that are perforated for the reception of the pivot pin 16. The base is slightly convex on its under surface, in a longitudinal direction, as shown in Fig. 9, and its front end is cut diagonally and sharpened to a knife edge, as shown in the drawing. The rear end of the base is bent upwardly, as indicated by numeral 27. Due to the convex bottom surface of member 14 it is evident that if the base is supported on a flat surface and if pressure is exerted on the top of the end 23, the body member 14 will be raised so as to provide a space between its bottom and the upper surface of base 25 for the reception of the tympan 11.

In order to move member 14 against the base so as to clamp the tympan between the two, a clamping lever 28 has been provided; this lever is also made of steel and is provided with an elongated slot 29 whose front end is widened somewhat as shown in Fig. 1, and whose rear end terminates in a cross bar 30, (Fig. 8). The rear end of lever 28 is downwardly inclined from line 31, and the bar 30 is located in the recess 24, and when lever 28 is moved to the position shown in Fig. 2, in which position bar 30 exerts a pressure between the upper surface of the base and the under surface of the projection 23 and clamps the gauge pin onto the tympan. When lever 28 is moved to the position shown in Fig. 8, the clamping pressure is removed and by pressing down on the end 23 the parts 14 and 25 will separate so that the assembly can be easily removed from the tympan.

From Figs. 5 and 6 it will be seen that the bottom of the body member is provided with five depressions 32, and the upper surface of the base has five projections 33 that are so located that they fit into the depressions when the lever 28 is in the position shown in Fig. 2, in which position the tympan is deformed by the interaction of the depressions and the projections with the result that the gauge pin is held securely in place.

When the gauge is to be applied, the press is first operated to make an impression directly on the tympan surface, after which one of the sheets to be printed is properly positioned with respect to the printing after which the gauge pins are located and fastened to the tympan by using the knife edge end of the base to cut the tympan at the proper position, after which the base is inserted through the opening and the lever 28 moved to the position shown in Fig. 2, whereupon the gauge pin will be firmly anchored in position.

The pins 20 serve to hold the paper in place and can be adjusted longitudinally to the exact position.

The construction of the gauge pins described above is such that the thickness can be kept down as low as twelve points over all so that they will work over the furniture.

Having described the invention, what is claimed as new is:

1. A gauge pin for printing presses comprising a body member, a resilient base provided with upwardly extending sides, a pivot pin extending through openings in the sides and through an opening in the body member, the base having a blade-like projection on one side of the pivot, said projection functioning as a clamping jaw, the bottom of the body member being curved away from the base at the rear of the pivot, the rear end of the body member having a narrow extension provided on its under side with a transversely extending recess and a lever having an opening for the reception of the narrow extension, the lever having a cam portion of greater width than thickness extending through the recess and engaging the base for rocking it about its pivot.

2. A gauge pin for printing presses comprising a body member, a base pivotally attached thereto, the body member having a plurality of concave depressions in its under surface, a base member pivotally attached to the body at a point to the rear of its center, the base having a flat thin blade extending forwardly of the pivot and adapted to be moved into clamping engagement with the under surface of the body member, the base having a plurality of convex projections registering with the depresssion in the body member, and means comprising a lever pivoted to the body member for rocking the base about its pivot and forcing it against the bottom of the body member.

3. A gauge pin for use with printing presses comprising in combination, a body member whose lower surface has its rear end upwardly curved, a resilient base member pivotally connected with the body member adjacent the point where the curvature commences, the upper surface of the base being slightly concave, and means for rocking the base about its pivot so as to force it into clamping engagement with the under surface of the body.

4. As an article of manufacture, a body member for use in a gauge pin, a projection of less width extending from the rear end thereof, the under side of the projection having a transverse recess, the upper surface of the body member having a groove extending transversely thereof for the reception of a pivot pin.

5. As an article of manufacture, a body member for use in a gauge pin, a projection of less width extending from the rear end thereof, the under side of the projection having a transverse recess, the upper surface of the body member having a groove extending transversely thereof for the reception of a pivot pin, and a groove extending longitudinally from the transverse groove.

6. As an article of manufacture, a body member for use in a gauge pin, a projection of less width extending from the rear end thereof, the under side of the projection having a transverse recess, the upper surface of the body member having a groove extending transversely thereof for the reception of a pivot pin, a groove extending longitudinally from the transverse groove, and a staple straddling the last named groove and forming therewith an opening for the reception of a pin.

7. A gauge pin for use with printing presses comprising, in combination, a body member of greater length than width and provided in its upper surface with a transversely extending groove, and a longitudinally extending recess that extends from the groove to the end of the body member, a pivot pin in the groove and normally projecting above the bottom of the recess, a resilient pin resting on the bottom of the recess and on the pivot pin, a staple straddling the resilient pin and forming a guide for the latter, a base connected with both ends of the pivot pin and means for rocking the base about its pivot.

8. A gauge pin for printing presses comprising, in combination, an elongated body member, a resilient base provided with upwardly extending sides, the body member having a transversely extending groove, a pivot pin extending through openings in the sides of the base and through the groove in the body member, one end of the body member having an extension of less width than the normal width thereof, and provided on its under side with a transverse recess, a lever having an opening for the reception of the extension, the lever having a cam portion of greater width than thickness which extends through the recess and engages the base for rocking it about its pivot, the end of the base having a bent up portion that is positioned in the path of the lever and serves as a stop therefor to limit its movement in one direction.

ELVIN C. DE VORSS.